(12) United States Patent
Zou

(10) Patent No.: US 12,480,999 B2
(45) Date of Patent: Nov. 25, 2025

(54) METHOD FOR OVERCURRENT DETECTION IN BATTERY, BATTERY MANAGEMENT SYSTEM, AND BATTERY

(71) Applicant: CONTEMPORARY AMPEREX TECHNOLOGY (HONG KONG) LIMITED, Hong Kong (CN)

(72) Inventor: Zhiting Zou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 168 days.

(21) Appl. No.: 18/495,239

(22) Filed: Oct. 26, 2023

(65) Prior Publication Data

US 2024/0061048 A1 Feb. 22, 2024

Related U.S. Application Data

(63) Continuation of application No. PCT/CN2021/126448, filed on Oct. 26, 2021.

(51) Int. Cl.
*G01R 31/3842* (2019.01)
*G01R 31/374* (2019.01)
*H02J 7/00* (2006.01)

(52) U.S. Cl.
CPC ....... *G01R 31/3842* (2019.01); *G01R 31/374* (2019.01); *H02J 7/00304* (2020.01)

(58) Field of Classification Search
None
See application file for complete search history.

(56) References Cited

U.S. PATENT DOCUMENTS

2016/0084913 A1 3/2016 Lupo et al.
2016/0372954 A1 12/2016 Kageyama et al.
(Continued)

FOREIGN PATENT DOCUMENTS

CN 102355021 A 2/2012
CN 104391251 A 3/2015
(Continued)

OTHER PUBLICATIONS

International Search Report for International Application PCT/CN2021/126448, dated Jul. 29, 2022.
(Continued)

*Primary Examiner* — Jas A Sanghera
(74) *Attorney, Agent, or Firm* — Ladas & Parry LLP

(57) ABSTRACT

A method for overcurrent detection in a battery, a battery management system, and a battery are provided. A present detection current is determined based on a pre-set detection current determination strategy, which can ensure the accuracy of the present detection current. Secondly, the current threshold is determined according to the charge/discharge state and the current temperature of the battery, that is, the influence of the charge/discharge state and the current temperature on the current threshold is taken into account, which enables the current threshold to match the charge/discharge state and the current temperature and to be more refined. Finally, when comparing the present detection current with the current threshold, if the present detection current exceeds the current threshold to satisfy the preset condition, it is determined that an overcurrent fault occurs in the battery, which makes the detection result accurate.

10 Claims, 7 Drawing Sheets

(56) References Cited

U.S. PATENT DOCUMENTS

| | | | |
|---|---|---|---|
| 2017/0194670 A1* | 7/2017 | Kawano | B60L 3/0046 |
| 2021/0098832 A1* | 4/2021 | Kobayakawa | G01R 31/3828 |
| 2022/0302733 A1* | 9/2022 | Howlett, III | H02J 7/00714 |
| 2023/0113916 A1* | 4/2023 | Park | H02J 7/0029 |

FOREIGN PATENT DOCUMENTS

| | | |
|---|---|---|
| CN | 104714187 A | 6/2015 |
| CN | 106374152 A | 2/2017 |
| CN | 108152558 A | 6/2018 |
| CN | 108501757 A | 9/2018 |
| JP | 2011137682 A | 7/2011 |
| JP | 2016082642 A | 5/2016 |

OTHER PUBLICATIONS

Extended European Search Report for EP application No. 21961697.6, dated Jul. 29, 2024.

* cited by examiner

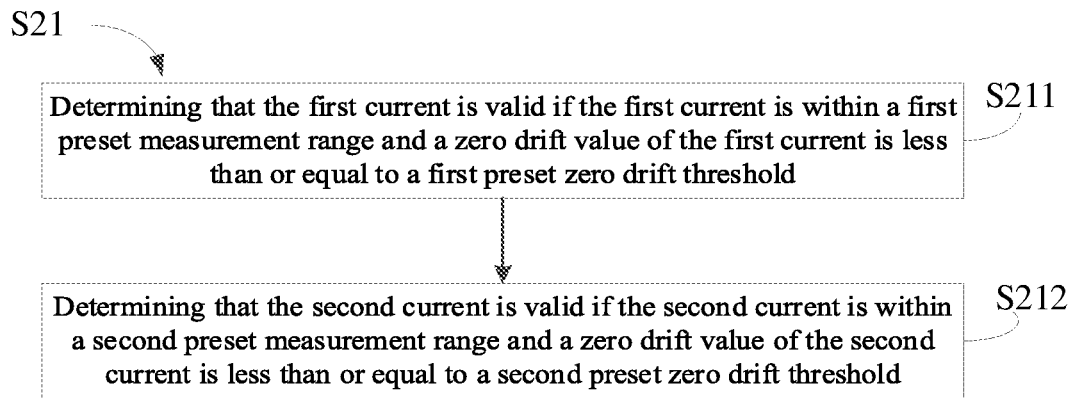

S23

- S231: Determining that the present detection current is the first current if the first current and the second current are both valid and the first current and the second current are reasonable
- S232: Determining that the present detection current is the greater one of the first current and the second current if the first current and the second current are both valid and the first current and the second current are unreasonable
- S233: Determining, if one of the first current and the second current is valid and the other is invalid, that the present detection current is the valid current
- S234: Determining that the present detection current is the greater one of the first current and the second current if the first current and the second current are both invalid and the first current is greater than or equal to an upper limit of the first preset measurement range and the second current is greater than or equal to an upper limit of the second preset measurement range
- S235: Determining that the present detection current is a detection current for a previous detection cycle if both the first current and the second current are invalid and the first current is less than an upper limit of the first preset measurement range and/or the second current is less than an upper limit of the second preset measurement range

- S41: Searching a preset temperature-to-threshold relationship table for a corresponding current threshold according to the current temperature and the charge/discharge state

S51 — If the preset number of times is one, which indicates that the present detection current exceeds the current threshold, determining that an overcurrent fault occurs in the battery S52 — If the preset number of times is multiple, reacquiring a new first current and a new second current when the present detection current exceeds the current threshold, and determining a new present detection current from the new first current and the new second current according to the detection current determination strategy; and when the new present detection current exceeds the current threshold, accumulating a corresponding number of times until the number of times the present detection current exceeds the current threshold reaches the preset number of times, then determining that an overcurrent fault occurs in the battery

FIG. 9

Apparatus for overcurrent detection in a battery 300

Current acquisition module 301

Present detection current determination module 302

State acquisition module 303

Temperature acquisition module 304

Threshold determination module 305

Fault determination module 306

FIG. 10

METHOD FOR OVERCURRENT DETECTION IN BATTERY, BATTERY MANAGEMENT SYSTEM, AND BATTERY

CROSS REFERENCE TO RELATED APPLICATION

This application is a continuation of International Patent Application No. PCT/CN2021/126448, filed on Oct. 26, 2021, which is incorporated by reference in its entirety.

TECHNICAL FIELD

Embodiments of the present application relate to the technical field of batteries, and in particular to a method for overcurrent detection in a battery, a battery management system, and a battery.

BACKGROUND

With the development of green energy, the application of batteries is becoming more and more widespread, especially in the field of new energy vehicles, information appliances or photovoltaic power generation, which have emerged in recent years, batteries are used as important energy storage and power supply devices, for example, to supply power for new energy vehicles or terminal equipment, etc., and to store energy for solar panels.

Batteries are manufactured from chemical materials with extremely high activity through a complex process, and are prone to overcurrent, overcharge voltage or overheating during the charging and discharging usage processes of the batteries. The battery management system (BMS) is a protection and management unit designed specifically for batteries. Specifically, the battery management system manages the charging and discharging of a battery and provides disconnection protection for the battery in case of a battery fault (e.g., overcurrent fault, and so on). When the current of the battery is greater than a set threshold, it is determined that an overcurrent fault occurs, which triggers disconnection of the battery from the external device (charging device or power supply device). It can be understood that overcurrent detection is a prerequisite for determining overcurrent faults, so there is a high requirement for the accuracy of overcurrent detection, which directly affects the judgment of overcurrent faults.

SUMMARY

In view of the above problems, the present application provides a method for overcurrent detection in a battery, a battery management system, and a battery, which can accurately detect an overcurrent fault in a battery.

In a first aspect, the present application provides a method for overcurrent detection in a battery, including: acquiring a first current at a negative electrode of the battery and a second current at a positive electrode of the battery; determining a present detection current from the first current and the second current according to a detection current determination strategy; acquiring a charge/discharge state of the battery and a current temperature of the battery; determining a current threshold according to the current temperature and the charge/discharge state; and determining that an overcurrent fault occurs in the battery if the present detection current exceeds the current threshold to satisfy a preset condition.

In the above implementation of the present application, firstly, the present detection current is determined from the first current at the negative electrode of the battery and the second current at the positive electrode of the battery based on the pre-set detection current determination strategy, which can ensure the accuracy of the present detection current, and compared to directly using the first current or the second current, can effectively prevent the present detection current from being inaccurate due to the collection error of the first current or the second current. Secondly, the current threshold is determined according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined. Finally, when comparing the present detection current with the current threshold, if the present detection current exceeds the current threshold to satisfy the preset condition, it is determined that an overcurrent fault occurs in the battery, which makes the detection result accurate. That is, by ensuring that the present detection current is accurate, setting an accurate and reasonable current threshold, and setting a preset condition during the comparison process, the overcurrent detection is made more accurate and reliable, and false alarms are effectively reduced, thus enabling accurate detection of the overcurrent fault in the battery.

In a possible implementation of the first aspect, the aforementioned determining a present detection current from the first current and the second current according to a detection current determination strategy includes: performing validity validation of the first current and the second current separately; performing reasonableness validation of the first current and the second current; and determining the present detection current according to the result of the validity validation and the result of the reasonableness validation.

In the above implementation of the present application, the validity validation and the reasonableness validation are performed separately on the collected first and second currents to acquire the validity and reasonableness of the first current and the validity and reasonableness of the second current, and then, the present detection current is determined accordingly. That is, the present detection current is determined after taking into consideration the validity and reasonableness of the first current and the validity and reasonableness of the second current and is thus more accurate, which is beneficial to improve the accuracy of the overcurrent detection.

In a possible implementation of the first aspect, the aforementioned performing validity validation of the first current and the second current separately includes: determining that the first current is valid if the first current is within a first preset measurement range and a zero drift value of the first current is less than or equal to a first preset zero drift threshold; or determining that the second current is valid if the second current is within a second preset measurement range and a zero drift value of the second current is less than or equal to a second preset zero drift threshold, wherein the first preset measurement range is a measurement range of a first current sensor for measuring the first current and the second preset measurement range is a measurement range of a second current sensor for measuring the second current.

In the above implementation of the present application, the validity of the first current is detected by combining the measurement range of the first current sensor and the first preset zero drift threshold, so that the validity of the first current can be accurately determined. If the first current is valid, the first current is within the first preset measurement range and its zero drift value is reasonable, which indicates that the first current sensor is normal, and the first current is acquired in a stable state of the first current sensor and is thus subjected to less interference.

Similarly, the validity of the second current is detected by combining the measurement range of the second current sensor and the second preset zero drift threshold, so that the validity of the second current can be accurately determined. If the second current is valid, the second current is within the second preset measurement range and its zero drift value is reasonable, which indicates that the second current sensor is normal, and the second current is acquired in a stable state of the second current sensor and is thus subjected to less interference.

In a possible implementation of the first aspect, the aforementioned performing reasonableness validation of the first current and the second current includes: determining that the first current and the second current are reasonable if the difference between the first current and the second current is within a preset deviation range; or determining that the first current and the second current are unreasonable if the difference between the first current and the second current is not within the preset deviation range.

In the above implementation of the present application, the first current and the second current are currents in the same loop in the same state that are detected by different sensors, and theoretically the first current and the second current should be the same or similar. Therefore, by determining, through comparison, whether the difference between the first current and the second current is within the preset deviation range, the reasonableness of the first current and the second current can be determined, thus ensuring that the collected first and second currents are the currents of the same loop in the same state, so as to prevent the present detection current determined based on the first and second current from being inaccurate due to the delay in the collection of the first or second currents, which affects the final detection result.

In a possible implementation of the first aspect, the aforementioned determining the present detection current according to the result of the validity validation and the result of the reasonableness validation includes: determining that the present detection current is the first current if the first current and the second current are both valid and the first current and the second current are reasonable; or determining that the present detection current is the greater one of the first current and the second current if the first current and the second current are both valid and the first current and the second current are unreasonable; or determining, if one of the first current and the second current is valid and the other is invalid, that the present detection current is the valid current; or determining that the present detection current is the greater one of the first current and the second current if the first current and the second current are both invalid and the first current is greater than or equal to an upper limit of the first preset measurement range and the second current is greater than or equal to an upper limit of the second preset measurement range; or determining that the present detection current is a detection current for a previous detection cycle if both the first current and the second current are invalid and the first current is less than an upper limit of the first preset measurement range and/or the second current is less than an upper limit of the second preset measurement range.

In the above implementation of the present application, in the case where both the first current and the second current are valid and reasonable, it is found through historical experimental data that it is more accurate to select the first current at the negative electrode as the present detection current. In the case where both the first current and the second current are valid and unreasonable, the larger one of the two is selected as the present detection current, making the detection result to be more prudent and more accurate. In the case where one of the first current and the second current is valid and the other is invalid, it is more appropriate to determine the present detection current to be the valid current. In the case where both the first and second currents are invalid and the first current exceeds the upper limit of the measurement range of the first current sensor and the second current exceeds the upper limit of the measurement range of the second current sensor, that is, in the case where both the first and second currents have limit exceeded errors, the present detection current is determined to be the greater one of the first and second currents, making the detection result to be more prudent and more accurate. In the case where both the first current and the second current are invalid and neither the first current nor the second current has a limit exceeded error, the present detection current is determined to be the detection current for the previous detection cycle, making the detection result more prudent and more accurate.

In a possible implementation of the first aspect, the first current sensor and the second current sensor have different operating principles, and the first current sensor is powered by a first power supply unit and the second current sensor is powered by a second power supply unit, the first power supply unit and the second power supply unit being independent of each other.

In the above implementation of the present application, based on the fact that the first current sensor and the second current sensor have different operating principles, which represents two current sensors of different types, it is possible to avoid the failure of the two current sensors due to the same cause, that is, to avoid the common cause failure of the two current sensors. When the first current sensor and the second current sensor have different operating principles, it is possible to reduce the risk of both failing at the same time, making the present detection current more accurate, which is beneficial to improve the accuracy of the detection result. In addition, the first current sensor and the second current sensor are powered by two independent power supply units, respectively, to avoid simultaneous failure of the two current sensors due to power supply reasons. That is, by the above approach, the first current and the second current are collected through two independent collection paths, respectively, and therefore do not affect each other, thus making the current detection current more accurate, which is beneficial to improve the accuracy of the detection result.

In a possible implementation of the first aspect, the first current sensor outputs a first signal that is subjected to analog-to-digital conversion processing by a first analog-to-digital converter to obtain the first current; and the second current sensor outputs a second signal that is subjected to analog-to-digital conversion processing by a second analog-to-digital converter to obtain the second current, wherein the first analog-to-digital converter and the second analog-to-digital converter are independent of each other.

In the above implementation of the present application, the first current is obtained by the first analog-to-digital converter processing the first signal collected by the first current sensor, and the second current is obtained by the second analog-to-digital converter processing the second signal collected by the second current sensor, and the two analog-to-digital conversion paths are independent of each other, so that it is possible to reduce the risk of sampling failures due to analog-to-digital conversion faults and make the present detection current more accurate, which is beneficial to improve the accuracy of the detection result.

In a possible implementation of the first aspect, the aforementioned determining a current threshold according to the current temperature and the charge/discharge state includes: searching a preset temperature-to-threshold relationship table for a corresponding current threshold according to the current temperature and the charge/discharge state, wherein the charge/discharge state includes a charge state or a discharge state, the temperature-to-threshold relationship table includes a correspondence between temperatures, the charge state, and current thresholds, and a correspondence between temperatures, the discharge state, and current thresholds.

In the above implementation of the present application, the temperature-to-threshold relationship table is pre-set, and by setting the temperature-to-threshold relationship table to include the correspondence between temperatures, the charge state, and current thresholds, and the correspondence between temperatures, the discharge state, and current thresholds, after the current temperature and the charge/discharge state are acquired, the corresponding current threshold can be determined by looking up the temperature-to-threshold relationship table. Based on the fact that the found current threshold is not only adapted to the current temperature, but also to the current charge/discharge state, so that the found current threshold is more accurate and refined. Compared with setting a more rough current threshold regardless of high or low temperature or regardless of the charge or discharge state, the above way of setting a temperature-to-threshold relationship table and determining the current threshold by looking up the table not only makes the current threshold more reasonable and accurate, but also is simple and convenient.

In a possible implementation of the first aspect, the aforementioned preset condition includes the number of times the present detection current exceeds the current threshold reaching a preset number of times, and the aforementioned determining that an overcurrent fault occurs in the battery if the present detection current exceeds the current threshold to satisfy a preset condition includes: if the preset number of times is one, which indicates that the present detection current exceeds the current threshold, determining that an overcurrent fault occurs in the battery; or if the preset number of times is multiple, reacquiring a new first current and a new second current when the present detection current exceeds the current threshold, and determining a new present detection current from the new first current and the new second current according to the detection current determination strategy; and when the new present detection current exceeds the current threshold, accumulating a corresponding number of times until the number of times the present detection current exceeds the current threshold reaches the preset number of times, then determining that an overcurrent fault occurs in the battery.

In the above implementation of the present application, in addition to setting the preset number of times to one, there is also a case where the preset number of times is multiple. When the preset number of times is multiple, by updating the present detection current several times and determining through comparison whether the present detection current exceeds the current threshold, and accumulating a corresponding number of times until the number of times the present detection current exceeds the current threshold reaches the preset number of times, it is determined that an overcurrent fault occurs in the battery, that is, only after the results of overcurrent faults are detected several times, it is finally determined that an overcurrent fault has occurred, which can prevent false alarms and make the final detection results more accurate.

In the second aspect, the present application provides an apparatus for overcurrent detection, including: a current acquisition module for acquiring a first current at a negative electrode of a battery and a second current at a positive electrode of the battery; a present detection current determination module for determining a present detection current from the first current and the second current according to a detection current determination strategy; a state acquisition module for acquiring a charge/discharge state of the battery; a temperature acquisition module for acquiring a current temperature of the battery; a threshold determination module for determining a current threshold according to the current temperature and the charge/discharge state; and a fault determination module for determining that an overcurrent fault occurs in the battery if the present detection current exceeds the current threshold to satisfy a preset condition.

In the above implementation of the present application, the present detection current determination module determines the present detection current from the first current at the negative electrode of the battery and the second current at the positive electrode of the battery based on the pre-set detection current determination strategy, which can ensure the accuracy of the present detection current, and compared to directly using the first current or the second current, can effectively prevent the present detection current from being inaccurate due to the collection error of the first current or the second current. Secondly, the current threshold is determined by the threshold determination module according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined. Finally, when comparing the present detection current with the current threshold, if the present detection current exceeds the current threshold to satisfy the preset condition, the fault determination module determines that an overcurrent fault occurs in the battery, which makes the detection result accurate. That is, by ensuring that the present detection current is accurate, setting an accurate and reasonable current threshold, and setting a preset condition during the comparison process, the overcurrent detection is made more accurate and reliable, and false alarms are effectively reduced, thus enabling accurate detection of the overcurrent fault in the battery.

In a third aspect, the present application provides a battery management system, including: a first current sensor for collecting a first current at a negative electrode of a battery; a second current sensor for collecting a second current at a positive electrode of the battery; a temperature sensor for collecting a current temperature of the battery; a processor that is communicatively connected to the first current sensor, the second current sensor, and the temperature sensor separately to acquire the first current, the second current, and the current temperature; and a memory, the memory being communicatively connected to the processor and memory storing instructions executable by the processor, wherein the instructions are executed by the processor to enable the processor to execute the method for overcurrent detection in a battery of the first aspect.

In the above implementation of the present application, the battery management system is capable of implementing an accurate and reliable overcurrent detection function.

In a fourth aspect, the present application provides a battery including the battery management system of the third aspect.

In the above-mentioned implementation of the present application, the battery has an accurate and reliable overcurrent detection and overcurrent protection function, which is more safe and reliable.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

BRIEF DESCRIPTION OF DRAWINGS

Various other advantages and benefits will become apparent to those of ordinary skill in the art upon reading the following detailed description of the preferred implementations. The accompanying drawings are for the purpose of illustrating the preferred implementations only and are not to be considered a limitation of the present application. Moreover, in all of the accompanying drawings, the same parts are indicated by the same reference numerals. In the accompanying drawings:

FIG. 5 is a schematic diagram of a sub-flow of step S21 in the method shown in FIG. 4;

FIG. 6 is a schematic diagram of a sub-flow of step S22 in the method shown in FIG. 4;

FIG. 7 is a schematic diagram of a sub-flow of step S23 in the method shown in FIG. 4;

FIG. 8 is a schematic diagram of a sub-flow of step S40 in the method shown in FIG. 3;

FIG. 9 is a schematic diagram of a sub-flow of step S50 in the method shown in FIG. 3;

FIG. 10 is a schematic diagram of an apparatus for overcurrent detection in a battery in some embodiments of the present application.

DETAILED DESCRIPTION

Figure 1:
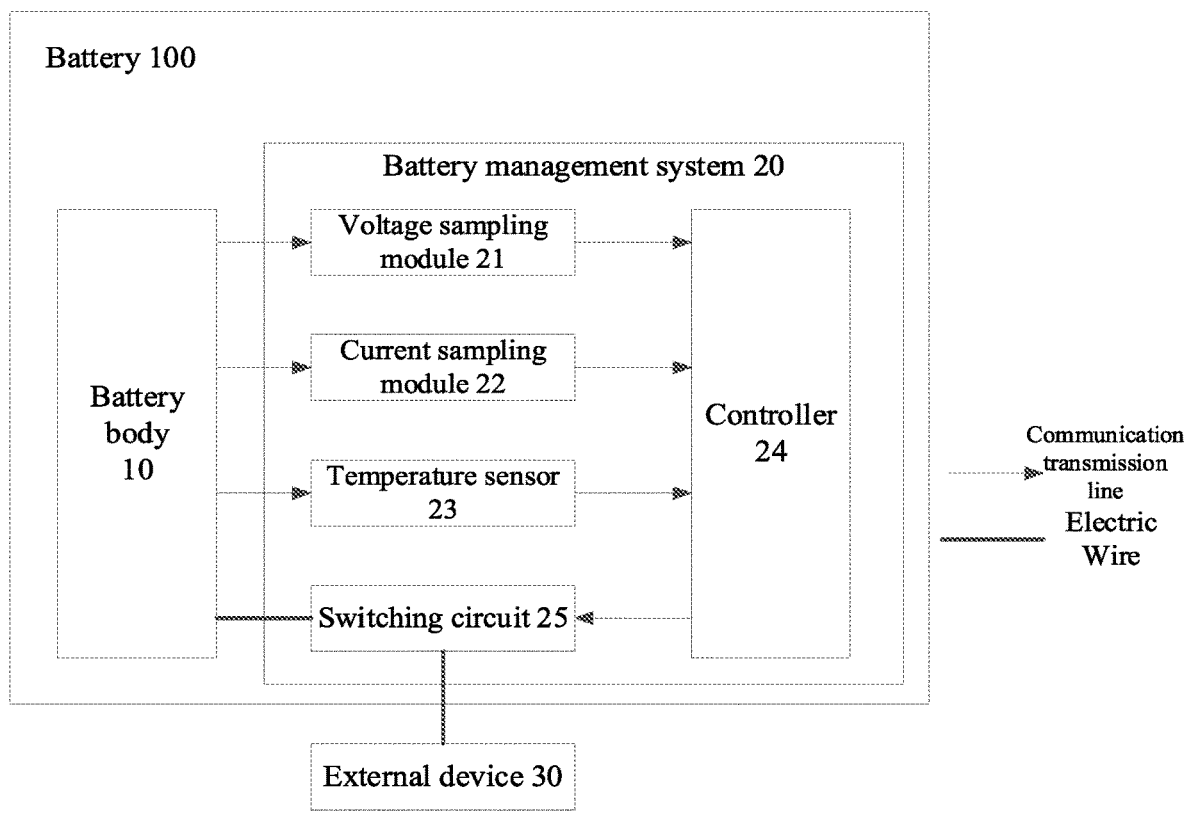
FIG. 1 is a schematic structural diagram of a battery in some embodiments of the present application.

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

With the development of green energy, the application of batteries is becoming more and more widespread, especially in the field of new energy vehicles, information appliances or photovoltaic power generation, which have emerged in recent years, batteries are used as important energy storage and power supply devices, for example, to supply power for new energy vehicles or terminal equipment, etc., and to store energy for solar panels. With continuous expansion of the application fields of batteries, the market demand is also constantly expanding.

For the safety of the battery and to avoid damage to the battery due to faults such as overcurrent, overcharge voltage or overheating during charging and discharging, a battery management system (BMS) is designed as a protection and management unit for the battery. As shown in FIG. 1, the battery 100 includes a battery body 10 and a battery management system 20, and the battery body 10 can be a battery cell, or one or more battery cell modules.

The battery management system 20 includes a voltage sampling module 21, a current sampling module 22, a temperature sensor 23, a controller 24, and a switching circuit 25, etc. Among them, the voltage sampling module 21 is used to collect the voltage of the battery body 10, the passive equalization power, etc., in real time, the current sampling module 22 is used to sample the current of the battery body 10 during the charge/discharge process, and the temperature sensor 23 is used to collect the temperature of the battery body 10 in real time. The voltage sampling module 21 and the current sampling module 22 transmit the collected data to the controller 24 (MCU), and the controller 24 determines based on the collected data the protection measures required by the battery 100 that correspond to abnormal states, such as undervoltage, overvoltage, overcurrent, short circuit, over temperature and low temperature, and then controls the switching circuit 25 to selectively turn off or turn on the connection of the battery 100 with an external device 30 (load or charger) according to the determined protection measure, so as to implement the determined protection measure. It can be understood that the voltage sampling module 21 and the current sampling module 22 may be implemented by the existing chip modules (e.g., integrated circuit ICs), or conventional circuits in the prior art, and the circuit structure of the voltage sampling module 21 and the current sampling module 22 will not be described in detail herein. The temperature sensor 23 can be realized by the existing thermal resistance or thermocouple, etc., and the structure and principle of the temperature sensor 23 is not described in detail here.

Figure 2:
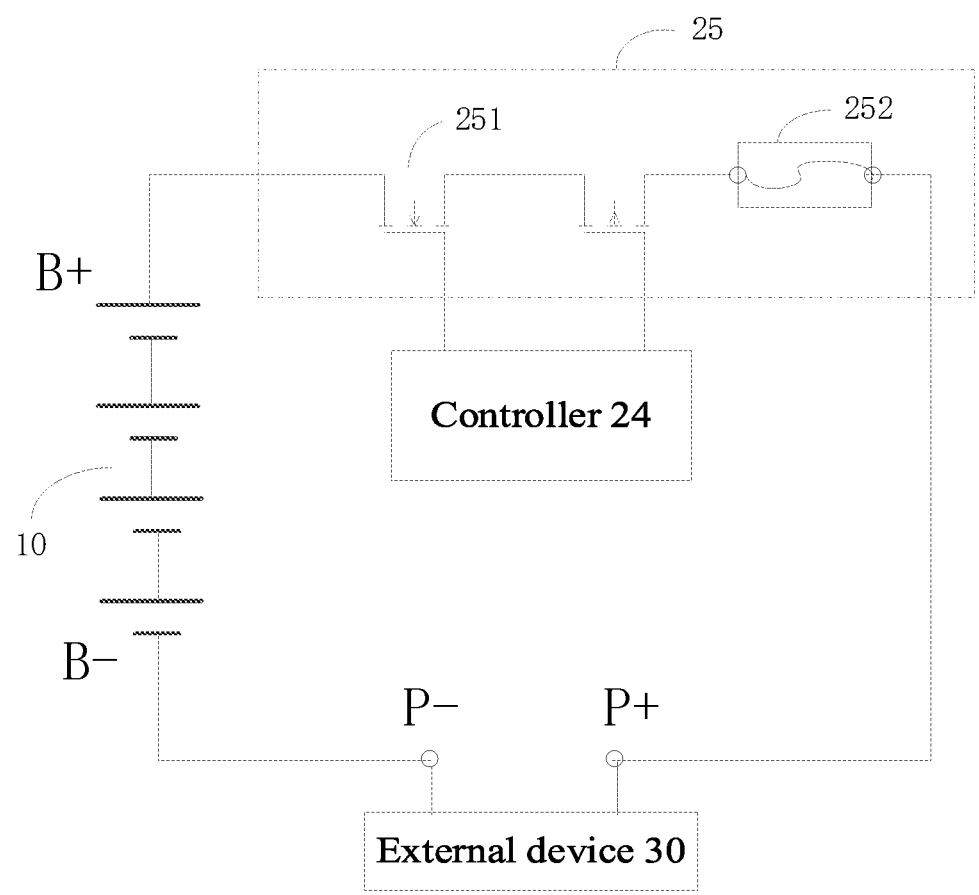
FIG. 2 is a schematic connection diagram of a switching circuit in some embodiments of the present application.

The switching circuit 25 can be implemented by the existing MOS tubes and fuses. In some embodiments, as shown in FIG. 2, the switching circuit 25 includes two MOS tubes 251 and a fuse 252, wherein the two MOS tubes 251 are connected in series with the fuse 252, and the control ends of the two MOS tubes 251 are each connected to the controller 24. The switching circuit 25 then connects the battery body 10 and the external device 30 (load or charger), which represents that the switching circuit 25 is connected in series with the external device 30. It will be understood that the MOS tube 251 is capable of turning on and off within the current threshold range or in the voltage threshold range, under the action of the driving voltage applied by the controller 24. When the controller 24 determines, based on the data collected by the voltage sampling module 21, the current sampling module 22, and the temperature sensor 23, that an abnormal state such as overcurrent, overcharge current or over temperature has occurred, it controls the MOS tube 251 to turn off, causing the battery 100 to be disconnected from the external device 30 (load or charger), so as to prevent the battery 100 from fire and explosion due to overcurrent, overvoltage or over temperature.

Here, when the detection current of the battery 100 is greater than a preset current threshold, it is determined that an overcurrent fault occurs, which triggers disconnection of the battery 100 from the external device 30 (charging device or power supply device) by the MOS tube 251. It can be understood that the accuracy of the detection current and the precision and reasonableness of the current threshold directly affect the accuracy of the overcurrent fault detection.

In order to be able to accurately detect overcurrent faults in the battery, the inventors of the present application have found after research that the accuracy of the detection current can be improved, so that the detection current is valid and reasonable and can accurately reflect the current in the loop in which the battery is currently located, for example, by using a current sensor with high accuracy to collect the detection current, or by using a plurality of current sensors to collect the current and determining the final detection current from the plurality of currents. It is also possible to optimize the precision and reasonableness of the current threshold to make the current threshold more reasonable in the state in which the battery is located, for example, by considering the influence of the charge/discharge state of the battery or the temperature of the battery on the current threshold. It can be understood that when the temperature of the battery is high, if the current threshold is relatively high, it will easily lead to further heating of the battery due to the high current, which will easily produce fire and explosion. When the battery is in the charge state, if the current threshold is relatively high, it is easy to cause the battery to be charged with a high current and thus not easy to be fully charged.

Specifically, in order to improve the accuracy of the detection current, the first current at the negative electrode of the battery and the second current at the positive electrode of the battery are acquired, and the present detection current is determined from the first current and the second current according to the detection current determination strategy. That is, the first current and the second current are acquired at the positive electrode and the negative electrode of the battery respectively, and the present detection current is determined from the first current and the second current according to the preset detection current determination strategy, which can reduce the risk of inaccurate currents due to the collection faults and ensure the accuracy of the present detection current, and compared to directly using the first current or the second current, can effectively prevent the present detection current from being inaccurate due to the collection error of the first current or the second current.

In order to optimize the precision and reasonableness of the current threshold, first, the charge/discharge state of this battery and the current temperature of this battery are acquired, then, according to the current temperature and the charge/discharge state, the current threshold is determined, and if the present detection current exceeds the current threshold so that the preset conditions is satisfied, it is determined that an overcurrent fault occurs in the battery. Here, the current threshold is determined according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined. Finally, when comparing the present detection current with the current threshold, if the present detection current exceeds the current threshold to satisfy the preset condition, it is determined that an overcurrent fault occurs in the battery, which makes the detection result accurate.

That is, by ensuring that the present detection current is accurate, setting an accurate and reasonable current threshold, and setting a preset condition during the comparison process, the overcurrent detection is made more accurate and reliable, and false alarms are effectively reduced, thus enabling accurate detection of the overcurrent fault in the battery.

The battery disclosed in the embodiments of the present application can be used, but not limited to, in an electrical apparatus, such as a vehicle, a ship, or an aircraft. It is possible to use the battery, etc., disclosed in the present application to form the power supply system for the electrical apparatus, so that, based on the fact that the battery has accurate and reliable overcurrent detection and overcurrent protection functions, the electrical apparatus and the power supply system are more secure and reliable.

Examples of the present application provide an electrical apparatus that uses a battery as a power supply, and the electrical apparatus may be, but is not limited to, a mobile phone, a tablet, a laptop, an electric toy, an electric tool, a battery vehicle, an electric vehicle, a ship, a spacecraft, and so on. Among them, the electric toy may include a stationary or mobile electric toy, for example, a game console, an electric car toy, an electric ship toy, and an electric aircraft toy, and the like, and the spacecraft may include an aircraft, a rocket, a space shuttle and a spaceship, and the like.

Figure 3:
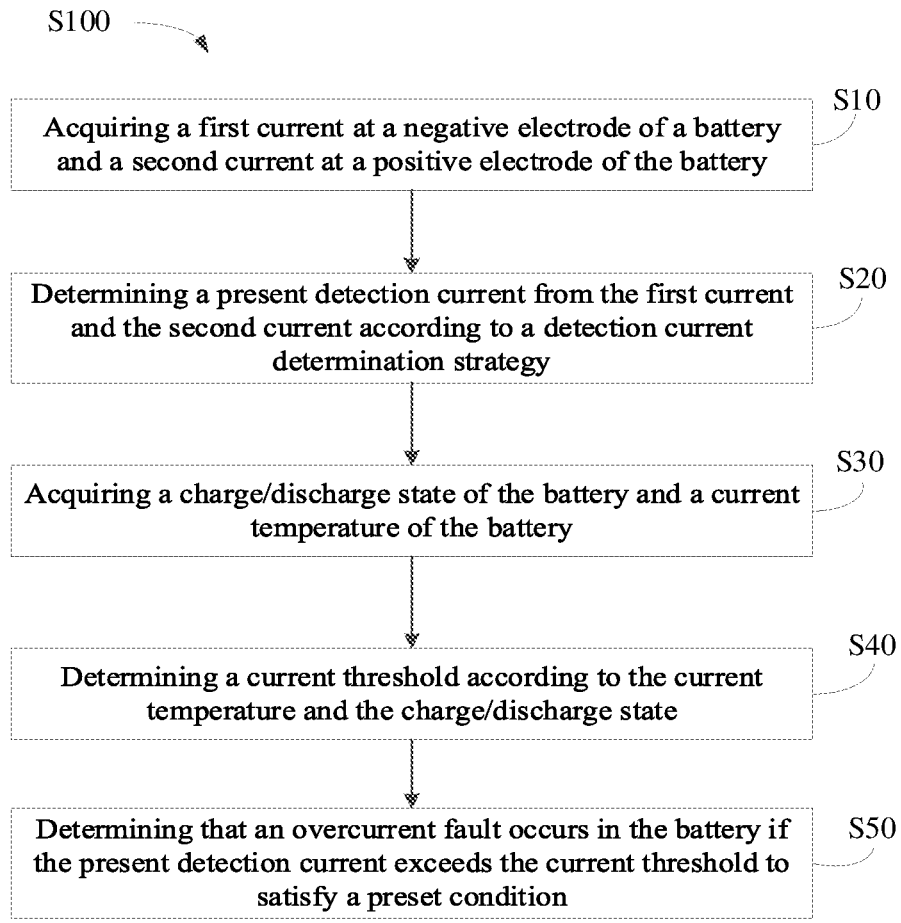
FIG. 3 is a schematic diagram of the flow of a method for overcurrent detection in a battery in some embodiments of the present application.

According to some embodiments of the present application, please refer to FIG. 3. FIG. 3 is a schematic diagram of the flow of a method for overcurrent detection in a battery provided by embodiments of the present application. The method S100 may specifically include the following steps:

S10: acquiring a first current at a negative electrode of the battery and a second current at a positive electrode of the battery.

The first current is the current collected at the negative electrode of the battery. Specifically, sensor A collects current signal A at the negative electrode of the battery, and current signal A is subjected to analog-to-digital conversion processing to acquire the first current; and sensor B collects current signal B at the positive electrode of the battery, and current signal B is subjected to analog-to-digital conversion processing to acquire the second current. It can be understood that the first current and the second current are currents collected at different locations in the same loop, and theoretically, the first current and the second current should be less different or be consistent.

S20: determining a present detection current from the first current and the second current according to a detection current determination strategy.

Here, the detection current determination strategy is used to guide the determination of the present detection current from the first current and the second current. It can be understood that if the first current (or the second current) is directly used as the present detection current, in the event where a fault occurs in the collection of the first current (or the second current), the first current (or the second current) has a large error, causing the present detection current inaccurate.

The present detection current is determined from the first current at the negative electrode of the battery and the second current at the positive electrode of the battery based on the pre-set detection current determination strategy, which can ensure the accuracy of the present detection current, and compared to directly using the first current or the second current, can effectively prevent the present detection current from being inaccurate due to the collection error of the first current or the second current.

S30: acquiring a charge/discharge state of the battery and a current temperature of the battery.

It can be understood that the charge/discharge state of the battery includes a charge state or a discharge state. When the battery is connected to the charger, the battery is in the charge state, and when the battery is connected to the load, the battery is in the discharge state. The battery has opposite current directions in the charge state and the discharge state, and the controller in the battery management system can parse out the charge/discharge state according to the current direction.

The current temperature of the battery is usually obtained through detection by a temperature sensor, for example, the temperature sensor can be attached to the surface of the battery cell module in the battery to collect the temperature signal, and then convert the temperature signal to the current temperature. It can be understood that the temperature sensor collects the temperature signal in real time to acquire the current temperature.

S40: determining a current threshold according to the current temperature and the charge/discharge state.

The current threshold is a current threshold used for comparison with the present detection current, and if the present detection current exceeds the current threshold, it can be determined that an overcurrent fault occurs. The current threshold is determined according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined.

S50: determining that an overcurrent fault occurs in the battery if the present detection current exceeds the current threshold to satisfy a preset condition.

When comparing the present detection current with the current threshold, if the present detection current exceeds the current threshold to satisfy the preset condition, it is determined that an overcurrent fault occurs in the battery, which makes the detection result accurate. It can be understood that the preset condition is used to restrain the present detection current from exceeding the current threshold, which is a condition that makes the detection result more prudent and accurate. For example, it can be that the present detection current exceeds the current threshold value by a certain percentage.

In the above implementation, firstly, the present detection current is determined from the first current at the negative electrode of the battery and the second current at the positive electrode of the battery based on the pre-set detection current determination strategy, which can ensure the accuracy of the present detection current, and compared to directly using the first current or the second current, can effectively prevent the present detection current from being inaccurate due to the collection error of the first current or the second current. Secondly, the current threshold is determined according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined. Finally, when comparing the present detection current with the current threshold, if the present detection current exceeds the current threshold to satisfy the preset condition, it is determined that an overcurrent fault occurs in the battery, which makes the detection result accurate. That is, by ensuring that the present detection current is accurate, setting an accurate and reasonable current threshold, and setting a preset condition during the comparison process, the overcurrent detection is made more accurate and reliable, and false alarms are effectively reduced, thus enabling accurate detection of the overcurrent fault in the battery.

Figure 4:
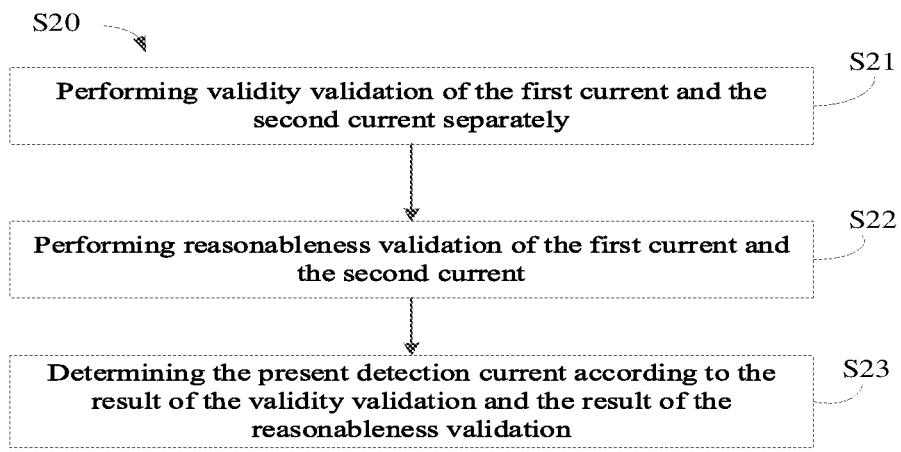
FIG. 4 is a schematic diagram of a sub-flow of step S20 in the method shown in FIG. 3.

According to some embodiments of the present application, optionally, please refer to FIG. 4, step S20 specifically includes:

S21: performing validity validation of the first current and the second current separately.

S22: performing reasonableness validation of the first current and the second current.

S23: determining the present detection current according to the result of the validity validation and the result of the reasonableness validation.

The validity validation may be understood as a verification of whether a fault occurs in the current collection process in order to determine that the current collection process is normal. For example, if the first current is much smaller than the detection range of the sensor or much larger than the detection range of the sensor, it means that a fault occurs in the collection process of the first current and that the first current is invalid.

It can be understood that the first current and the second current are currents collected at different locations in the same loop, and theoretically, the first current and the second current should be less different or be consistent. Therefore, the reasonableness validation can be understood as a verification of whether the first current and the second current are currents in the same loop. It can be understood that if the difference between the first and second currents is abnormally large, it is obvious that the first and second currents are unreasonable.

In the above implementation, the validity validation and the reasonableness validation are performed separately on the collected first and second current to acquire the validity and reasonableness of the first current and the validity and reasonableness of the second current, and then, the present detection current is determined accordingly. That is, the present detection current is determined after taking into consideration the validity and reasonableness of the first current and the validity and reasonableness of the second current, which is more accurate and beneficial to improve the accuracy of the overcurrent detection.

According to some embodiments of the present application, optionally, please refer to FIG. 5, step S21 specifically includes:

S211: determining that the first current is valid if the first current is within a first preset measurement range and a zero drift value of the first current is less than or equal to a first preset zero drift threshold.

S212: determining that the second current is valid if the second current is within a second preset measurement range and a zero drift value of the second current is less than or equal to a second preset zero drift threshold.

Here, the first preset measurement range is a measurement range of a first current sensor for measuring the first current and the second preset measurement range is a measurement range of a second current sensor for measuring the second current.

It can be understood that the first preset zero drift threshold is a threshold that reflects the zero drift of the first current sensor. The second preset zero drift threshold is a threshold that reflects the zero drift of the second current sensor. Zero drift refers to the fact that a slow output voltage is generated when the amplifier circuit is measured at the output end with a sensitive DC meter when there is no input signal, that is, the baseline of the waveform of the current signal is shifted from the zero line.

If the first current is within the first preset measurement range, it indicates that the first current sensor is normal, and if the zero drift value of the first current is less than or equal to the first preset zero drift threshold, it indicates that the state of the first current sensor is stable, so the first current is valid when both conditions are satisfied.

If the second current is within the second preset measurement range, it indicates that the second current sensor is normal, and if the zero drift value of the second current is less than or equal to the second preset zero drift threshold, it indicates that the state of the second current sensor is stable, so the second current is valid when both conditions are satisfied. It can be understood that the state being stable can be the temperature and the input voltage being stable with little disturbance.

In the above implementation of the present application, the validity of the first current is detected by combining the measurement range of the first current sensor and the first preset zero drift threshold, so that the validity of the first current can be accurately determined. If the first current is valid, the first current is within the first preset measurement range and its zero drift value is reasonable, which indicates that the first current sensor is normal, and the first current is acquired in a stable state of the first current sensor and is thus subjected to less interference.

Similarly, the validity of the second current is detected by combining the measurement range of the second current sensor and the second preset zero drift threshold, so that the validity of the second current can be accurately determined. If the second current is valid, the second current is within the second preset measurement range and its zero drift value is reasonable, which indicates that the second current sensor is normal, and the second current is acquired in a stable state of the second current sensor and is thus subjected to less interference.

According to some embodiments of the present application, optionally, please refer to FIG. 6, step S22 specifically includes:

S221: determining that the first current and the second current are reasonable if the difference between the first current and the second current is within a preset deviation range.

S222: determining that the first current and the second current are unreasonable if the difference between the first current and the second current is not within the preset deviation range.

Based on the fact that the first current and the second current are currents collected at different locations in the same loop, theoretically, the first current and the second current should be less different or be consistent. In order to characterize the magnitude of the difference, a preset deviation range is used as a basis for judgment. It can be understood that the preset deviation range is a current range that can be determined by a person skilled in the art based on the accuracy of the two current sensors and the actual test situation.

In the above implementation, the first current and the second current are currents in the same loop in the same state that are detected by different sensors, and theoretically the first current and the second current should be the same or similar. Therefore, by determining, through comparison, whether the difference between the first current and the second current is within the preset deviation range, the reasonableness of the first current and the second current can be determined, thus ensuring that the collected first and second currents are the currents of the same loop in the same state, so as to prevent the present detection current determined based on the first and second current from being inaccurate due to the delay in the collection of the first or second currents, which affects the final detection result.

According to some embodiments of the present application, optionally, please refer to FIG. 7, step S23 specifically includes:

S231: determining that the present detection current is the first current if the first current and the second current are both valid and the first current and the second current are reasonable.

The inventors of the present application found in historical experiments that the current sensor at the negative electrode has a higher accuracy, and thus if both the first current and the second current are valid and reasonable, it is more accurate to select the first current at the negative electrode as the present detection current. Here, the historical experiments include: collecting multiple sets of valid and reasonable first and second currents, taking the first current as the present detection current and the second current as the present detection current separately for overcurrent detection, and counting the accuracies of the detection results in these two cases, and it is found that the accuracy of the detection results in the case of taking the first current as the present detection current is higher.

S232: determining that the present detection current is the greater one of the first current and the second current if the first current and the second current are both valid and the first current and the second current are unreasonable.

In the case where both the first current and the second current are valid and unreasonable, if the smaller one of the two is selected as the present detection current for comparison with the current detection threshold, a misjudgment is likely to occur. On the contrary, if the larger one of the two is selected as the present detection current, the detection result is made more prudent and more accurate.

S233: determining, if one of the first current and the second current is valid and the other is invalid, that the present detection current is the valid current.

It can be understood that in the case where one of the first current and the second current is valid and the other is invalid, it is more appropriate to determine the present detection current to be the valid current.

S234: determining that the present detection current is the greater one of the first current and the second current if the first current and the second current are both invalid and the first current is greater than or equal to an upper limit of the first preset measurement range and the second current is greater than or equal to an upper limit of the second preset measurement range. In the case where both the first current and the second current are invalid and the first current exceeds the upper limit of the measurement range of the first current sensor and the second current exceeds the upper limit of the measurement range of the second current sensor, that is, in the case where both the first current and the second current have limit exceeded errors, if the smaller one of the two is selected as the present detection current for comparison with the current detection threshold, a misjudgment is likely to occur. On the contrary, if the larger one of the two is selected as the present detection current, the detection result is made more prudent and more accurate.

S235: determining that the present detection current is a detection current for a previous detection cycle if both the first current and the second current are invalid and the first current is less than an upper limit of the first preset measurement range and/or the second current is less than an upper limit of the second preset measurement range.

In the case where both the first current and the second current are invalid and neither the first current nor the second current has a limit exceeded error, which indicates that the first current is smaller than the lower limit of the measurement range of the first current sensor and the second current is smaller than the lower limit of the measurement range of the second current sensor and are both invalid, if either of them is selected as the present detection current, the error is large. Therefore, the present detection current is determined as the detection current for the previous detection cycle, making the detection result more prudent and more accurate.

In the above implementation, in the case where both the first current and the second current are valid and reasonable, it is found through historical experimental data that it is more accurate to select the first current at the negative electrode as the present detection current. In the case where both the first current and the second current are valid and unreasonable, the larger one of the two is selected as the present detection current, making the detection result to be more prudent and more accurate. In the case where one of the first current and the second current is valid and the other is invalid, it is more appropriate to determine the present detection current to be the valid current. In the case where both the first and second currents are invalid and the first current exceeds the upper limit of the measurement range of the first current sensor and the second current exceeds the upper limit of the measurement range of the second current sensor, that is, in the case where both the first and second currents have limit exceeded errors, the present detection current is determined to be the greater one of the first and second currents, making the detection result to be more prudent and more accurate. In the case where both the first current and the second current are invalid and neither the first current nor the second current has a limit exceeded error, the present detection current is determined to be the detection current for the previous detection cycle, making the detection result more prudent and more accurate.

According to some embodiments of the present application, optionally, the first current sensor and the second current sensor have different operating principles, and the first current sensor is powered by a first power supply unit and the second current sensor is powered by a second power supply unit, the first power supply unit and the second power supply unit being independent of each other.

The first current sensor and the second current sensor have different types and different operating principles, for example, the first current sensor may be an existing Hall current sensor and the second current sensor may be an existing Rogowski coil type current sensor. Two current sensors with different operating principles collect current separately, which can avoid the failure of the two current sensors due to the same reason, i.e., avoid the common cause failure of the two current sensors.

If the first current sensor and the second current sensor are connected to the battery, if the voltage of the battery is unstable, it is easy to make both the first current and the second current have large zero drifts, which affects the accuracy of the current detection. Thus, the first current sensor is powered by the first power supply unit (e.g., battery 1 #) and the second current sensor is powered by the second power supply unit (e.g., battery 2 #), which can be beneficial to increase the accuracy of the present detection current and avoid the simultaneous failure of the two current sensors due to power supply reasons.

In the above implementation, based on the fact that the first current sensor and the second current sensor have different operating principles, which represents two current sensors of different types, it is possible to avoid the failure of the two current sensors due to the same cause, that is, to avoid the common cause failure of the two current sensors. When the first current sensor and the second current sensor have different operating principles, it is possible to reduce the risk of both failing at the same time, making the present detection current more accurate, which is beneficial to improve the accuracy of the detection result. In addition, the first current sensor and the second current sensor are powered by two independent power supply units, respectively, to avoid simultaneous failure of the two current sensors due to power supply reasons. That is, by the above approach, the first current and the second current are collected through two independent collection paths, respectively, and therefore do not affect each other, thus making the current detection current more accurate, which is beneficial to improve the accuracy of the detection result.

According to some embodiments of the present application, optionally, the first current sensor outputs a first signal that is subjected to analog-to-digital conversion processing by a first analog-to-digital converter to obtain the first current. The second current sensor outputs a second signal that is subjected to analog-to-digital conversion processing by a second analog-to-digital converter to obtain the second current. Here, the first analog-to-digital converter and the second analog-to-digital converter are independent of each other.

It can be understood that the first analog-to-digital converter performs analog-to-digital conversion processing of the first signal to obtain the first current. The type of the first current sensor determines the first signal, which may be a current signal or a voltage signal, and so on. Similarly, the second analog-to-digital converter performs analog-to-digital conversion processing of the second signal to obtain the second current. The type of the second current sensor determines the second signal, which can be a current signal or a voltage signal, and so on.

To reduce the risk of sampling failures due to analog-to-digital conversion faults, the first analog-to-digital converter and the second analog-to-digital converter are independent of each other. In some embodiments, the first analog-to-digital converter may be an ADC analog-to-digital converter. It can be understood that the ADC analog-to-digital converter may be calibrated before sampling, for example by collecting a preset voltage signal (e.g., a voltage signal of 2.5V), and converting it through that ADC analog-to-digital converter, and if the voltage converted is approximately 2.5V, the ADC analog-to-digital converter can be determined to be normal.

In some embodiments, the second analog-to-digital converter may be another ADC analog-to-digital converter, or a voltage detector of model AME8550. The second analog-to-digital converter may also be calibrated before collection, and the specific calibration manner can be designed by those skilled in the art themselves, and will not be repeated here.

In the above implementation, the first current is obtained by the first analog-to-digital converter processing the first signal collected by the first current sensor, and the second current is obtained by the second analog-to-digital converter processing the second signal collected by the second current sensor, and the two analog-to-digital conversion paths are independent of each other, so that it is possible to reduce the risk of sampling failures due to analog-to-digital conversion faults and make the present detection current more accurate, which is beneficial to improve the accuracy of the detection result.

According to some embodiments of the present application, optionally, please refer to FIG. 8, step S40 specifically includes:

S41: searching a preset temperature-to-threshold relationship table for a corresponding current threshold according to the current temperature and the charge/discharge state.

It can be understood that the charge/discharge state includes a charge state or a discharge state. For example, when the battery is connected to the charger, it is in the charge state, and when the battery is connected to the load, it is in the discharge state.

The temperature-to-threshold relationship table includes the correspondence between temperatures, the charge state, and current thresholds, and the correspondence between temperatures, the discharge state, and current thresholds, so that after the current temperature and the charge/discharge state are acquired, the corresponding current threshold can be determined by looking up the temperature-to-threshold relationship table. For example, the temperature-to-threshold relationship table may be as shown in Table 1 below:

TABLE 1

Temperature-to-threshold relationship table

| Temperature (° C.) | Discharge state | | Charge state | |
| --- | --- | --- | --- | --- |
| | Current threshold (A) | Fault tolerance time interval (s) | Current threshold (A) | Fault tolerance time interval (s) |
| 60 | 840 | 5 | 480 | 5 |
| 50 | 840 | 5 | 480 | 5 |
| 40 | 840 | 5 | 480 | 5 |
| 30 | 840 | 5 | 480 | 5 |
| 20 | 840 | 5 | 480 | 5 |
| 10 | 840 | 5 | 480 | 5 |
| 0 | 840 | 5 | 480 | 5 |
| −5 | 840 | 5 | 380 | 5 |
| −10 | 840 | 5 | 280 | 5 |
| −15 | 650 | 5 | 210 | 5 |
| −20 | 470 | 5 | 140 | 5 |
| −25 | 370 | 5 | 90 | 5 |
| −30 | 270 | 5 | 40 | 5 |

Table 1 is only an illustrative example, and it can be understood that, for the temperatures between the two boundary temperatures in Table 1, the current threshold corresponding to a temperature between the two boundary temperatures can be determined by means of a linear interpolation method. For example, if the current temperature is T=−12° C., it is known that T0=−15° C., which corresponds to the current threshold I0=650 A, and T1=−10° C., which corresponds to the current threshold I1=840 A, then the current threshold I corresponding to the current temperature T can be derived according to the following interpolation formula I.

$$\frac{I - I_0}{I_1 - I_0} = \frac{T - T_0}{T_1 - T_0}$$

The fault tolerance time interval in Table 1 means that when an overcurrent fault occurs, the battery must be disconnected and protected within the fault tolerance time interval, that is, the battery must be disconnected from external devices.

In the above implementation, the temperature-to-threshold relationship table is pre-set, and by setting the temperature-to-threshold relationship table to include the correspondence between temperatures, the charge state, and current thresholds, and the correspondence between temperatures, the discharge state, and current thresholds, after the current temperature and the charge/discharge state are acquired, the corresponding current threshold can be determined by looking up the temperature-to-threshold relationship table. Based on the fact that the found current threshold is not only adapted to the current temperature, but also to the current charge/discharge state, so that the found current threshold is more accurate and refined. Compared with setting a more rough current threshold regardless of high or low temperature or regardless of the charge or discharge state, the above way of setting a temperature-to-threshold relationship table and determining the current threshold by looking up the table not only makes the current threshold more reasonable and accurate, but also is simple and convenient.

According to some embodiments of the present application, optionally, the preset condition includes the number of times the present detection current exceeds the current threshold reaching a preset number of times. For example, the preset number of times can be 1, 2, 3, etc., which can be set according to the actual situation.

Referring to FIG. 9, the aforementioned step S50 specifically includes:

S51: if the preset number of times is one, which indicates that the present detection current exceeds the current threshold, determining that an overcurrent fault occurs in the battery.

If the preset number of times is one, the present detection current and the current threshold are compared once, and if the present detection current exceeds the current threshold, it is determined that an overcurrent fault occurs in the battery.

S52: if the preset number of times is multiple, reacquiring a new first current and a new second current when the present detection current exceeds the current threshold, and determining a new present detection current from the new first current and the new second current according to the detection current determination strategy; and when the new present detection current exceeds the current threshold, accumulating a corresponding number of times until the number of times the present detection current exceeds the current threshold reaches the preset number of times, then determining that an overcurrent fault occurs in the battery.

For example, the preset number is 3, then if the present detection current is detected to exceed the current threshold for the 1st time, the new first and second currents are reacquired for the 2nd detection, for example, the original first and second signals are subjected to analog-to-digital conversion processing again to obtain the new first and second currents, and the new present detection current is determined from the new first and new second currents; and when the new present detection current exceeds the current threshold, the new first and second currents are reacquired for the 3rd detection, the 4th detection, etc., until the number of times the new present detection current exceeds the current threshold reaches 3, it is determined that an overcurrent fault occurs in the battery.

In this embodiment, by updating the present detection current several times and determining through comparison whether the present detection current exceeds the current threshold, and accumulating a corresponding number of times until the number of times the present detection current exceeds the current threshold reaches the preset number of times, it is determined that an overcurrent fault occurs in the battery, that is, only after the results of overcurrent faults are detected several times, it is finally determined that an overcurrent fault has occurred, which can prevent false alarms and make the final detection results more accurate.

According to some embodiments of the present application, a method for overcurrent detection in a battery, including:

(1) Collecting and acquiring a first current at the negative electrode of the battery and a second current at the positive electrode of the battery using two independent paths, respectively, wherein the independent path corresponding to the first current includes a first current sensor, a first analog-to-digital converter, and a first power supply unit that supplies power to the first current sensor; and the independent path corresponding to the second current includes a second current sensor, a second analog-to-digital converter, and a second power supply unit that supplies power to the second current sensor.

(2) Determining the present detection current from the first current and the second current in accordance with the detection current determination strategy in Table 2 below.

TABLE 2

Detection current determination strategy

| First current | Second current | Reasonableness validation | Present detection current |
|---|---|---|---|
| Valid | Valid | Reasonable | First current |
| Valid | Valid | Unreasonable | Larger value |
| Valid | Invalid | / | First current |
| Invalid | Valid | / | Second current |
| Invalid (limit exceeded error) | Invalid (limit exceeded error) | / | Larger value |
| Invalid (other errors) | Invalid (other errors) | / | Keep the value of the previous detection cycle |

Other errors in Table 2 are non-limit exceeded errors. Combined with the detection current determination strategy in Table 2, validity and reasonableness validations are performed on the first current and the second current, and the present detection current is determined according to the validity and reasonableness validation results, which makes the present detection current accurate and the detection results more prudent and more accurate.

(3) Searching a preset temperature-to-threshold relationship table for a corresponding current threshold according to the current temperature and the charge/discharge state, wherein the temperature-to-threshold relationship table includes a correspondence between temperatures, the charge state, and current thresholds, and a correspondence between temperatures, the discharge state, and current thresholds.

(4) Determining that an overcurrent fault occurs in the battery if the number of times the present detection current exceeds the current threshold reaches a preset number of times (e.g., 3).

By setting the temperature-to-threshold relationship table to include the correspondence between temperatures, the charge state, and current thresholds, and the correspondence between temperatures, the discharge state, and current thresholds, after the current temperature and the charge/discharge state are acquired, the corresponding current threshold can be determined by looking up the temperature-to-threshold relationship table. Based on the fact that the found current threshold is not only adapted to the current temperature, but also to the current charge/discharge state, so that the found current threshold is more accurate and refined. Compared with setting a more rough current threshold regardless of high or low temperature or regardless of the charge or discharge state, the above way of setting a temperature-to-threshold relationship table and determining the current threshold by looking up the table not only makes the current threshold more reasonable and accurate, but also is simple and convenient.

When comparing the present detection current with the current threshold, if the number of times the present detection current exceeds the current threshold reaches a preset number of times, it is determined that an overcurrent fault occurs in the battery, which makes the detection result accurate.

According to some embodiments of the present application, please refer to FIG. 10, the present application further provides an apparatus 300 for overcurrent detection in a battery, including: a current acquisition module 301, a present detection current determination module 302, a state acquisition module 303, a temperature acquisition module 304, a threshold determination module 305, and a fault determination module 306.

Among them, the current acquisition module 301 is used for acquiring a first current at a negative electrode of the battery and a second current at a positive electrode of the battery. The present detection current determination module 302 is used for determining a present detection current from the first current and the second current according to a detection current determination strategy. The state acquisition module 303 is used for acquiring a charge/discharge state of the battery. The temperature acquisition module 304 is used for acquiring a current temperature of the battery. The threshold determination module 305 is used for determining a current threshold according to the current temperature and the charge/discharge state. The fault determination module 306 is used for determining that an overcurrent fault occurs in the battery if the present detection current exceeds the current threshold to satisfy a preset condition.

In the above implementation, the present detection current determination module 302 determines the present detection current from the first current at the negative electrode of the battery and the second current at the positive electrode of the battery based on the pre-set detection current determination strategy, which can ensure the accuracy of the present detection current, and compared to directly using the first current or the second current, can effectively prevent the present detection current from being inaccurate due to the collection error of the first current or the second current. Secondly, the current threshold is determined by the threshold determination module according to the charge/discharge state and the current temperature of the battery, that is, the influence of the charge/discharge state and the current temperature on the current threshold is taken into account, for example, the current threshold required under high temperature and low temperature is different, and the current threshold required under the charge state and the discharge state is different, which enables the current threshold to match the charge/discharge state and the current temperature and to be more refined. Finally, when comparing the present detection current with the current threshold, if the present detection current exceeds the current threshold to satisfy the preset condition, the fault determination module 306 determines that an overcurrent fault occurs in the battery, which makes the detection result accurate. That is, by ensuring that the present detection current is accurate, setting an accurate and reasonable current threshold, and setting a preset condition during the comparison process, the overcurrent detection is made more accurate and reliable, and false alarms are effectively reduced, thus enabling accurate detection of the overcurrent fault in the battery.

Figure 11:
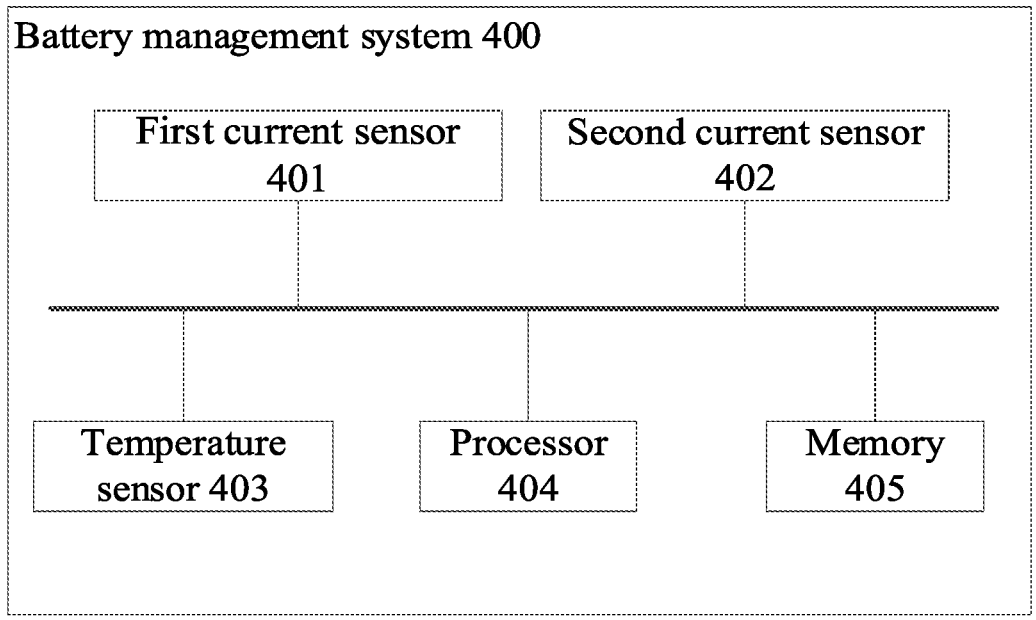
FIG. 11 is a schematic structural diagram of a battery management system in some embodiments of the present application.

According to some embodiments of the present application, please refer to FIG. 11, the present application further provides a battery management system 400, including: a first current sensor 401, a second current sensor 402, a temperature sensor 403, a processor 404, and a memory 405.

Among them, the first current sensor 401 is connected at a negative electrode of a battery and used for collecting a first current at the negative electrode of the battery, and the second current sensor 402 is connected at a positive electrode of the battery and used for collecting a second current at the positive electrode of the battery. The temperature sensor 403 can be attached to the surface of a battery cell module in the battery for collecting a current temperature of the battery.

The processor 404 is communicatively connected to the first current sensor 401, the second current sensor 402, and the temperature sensor 403 separately to acquire the first current, the second current, and the current temperature. The memory 405 is communicatively connected to the processor 404, and the memory 405 stores instructions executable by the processor 404, wherein the instructions are executed by the processor 404 to enable the processor 404 to execute the method for overcurrent detection in a battery of the first aspect.

Among them, the memory 405 may include a read-only memory and a random access memory, and provide instructions and data to the processor 404. A portion of the memory 405 may also include a non-volatile random access memory (NVRAM). The memory 405 stores operational instructions, executable modules or data structures, or a subset thereof, or an extended set thereof.

The processor 404 may be an integrated circuit chip with processing capabilities for signals. During implementation, the steps of the method for overcurrent detection in a battery described above may be accomplished by integrated logic circuitry in hardware in processor 404 or by instructions in the form of software. The above processor 404 may be a general purpose processor, a digital signal processor (DSP), a microprocessor or a microcontroller, and may further include an application specific integrated circuit (ASIC), a field-programmable gate array (FPGA), or other programmable logic devices, discrete gates or transistor logic devices, discrete hardware components. This processor may implement or execute the aforementioned method for overcurrent detection in a battery.

Based on the ability of the battery management system 400 to execute the aforementioned method for overcurrent detection in a battery, the battery management system 400 is capable of achieving accurate and reliable overcurrent detection functionality.

According to some embodiments of the present application, the present application further provides a battery, including the aforementioned battery management system.

In the above-mentioned implementation, the battery has an accurate and reliable overcurrent detection and overcurrent protection function, which is more safe and reliable.

Finally, it should be noted that the above embodiments are used only to illustrate, in stead of limiting, the technical solutions of the present application; although the present application is described in detail with reference to the preceding embodiments, it should be understood by those of ordinary skill in the art that: it is still possible to modify the technical solutions recorded in the preceding embodiments, or to equivalently replace some or all of the technical features; and these modifications or replacements do not make the essence of the corresponding technical solutions depart from the scope of the technical solutions of the embodiments of the present application, which should be covered by the scope of the claims and specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A method for overcurrent detection in a battery, comprising:
    acquiring a first current at a negative electrode of the battery and a second current at a positive electrode of the battery;
    determining a present detection current from the first current and the second current according to a detection current determination strategy;
    acquiring a charge/discharge state of the battery and a current temperature of the battery;
    determining a current threshold according to the current temperature and the charge/discharge state; and
    determining that an overcurrent fault occurs in the battery when the present detection current exceeds the current threshold to satisfy a preset condition;
wherein determining the present detection current from the first current and the second current according to the detection current determination strategy comprises:
    performing a validity validation of the first current and the second current separately;
    performing a reasonableness validation of the first current and the second current; and
    determining the present detection current according to the result of the validity validation and the result of the reasonableness validation;
wherein performing the validity validation of the first current and the second current separately comprises:
    determining that the first current is valid when the first current is within a first preset measurement range and a zero drift value of the first current is less than or equal to a first preset zero drift threshold: or
    determining that the second current is valid when the second current is within a second preset measurement range and a zero drift value of the second current is less than or equal to a second preset zero drift threshold; and
wherein the first preset measurement range is a measurement range of a first current sensor for measuring the first current, and the second preset measurement range is a measurement range of a second current sensor for measuring the second current.

2. The method according to claim 1, wherein performing the reasonableness validation of the first current and the second current comprises:
    determining that the first current and the second current are reasonable when the difference between the first current and the second current is within a preset deviation range; or
    determining that the first current and the second current are unreasonable when the difference between the first current and the second current is not within the preset deviation range.

3. The method according to claim 2, wherein determining the present detection current according to the result of the validity validation and the result of the reasonableness validation comprises:
    determining that the present detection current is the first current when the first current and the second current are both valid and the first current and the second current are reasonable; or
    determining that the present detection current is the greater one of the first current and the second current when the first current and the second current are both valid and the first current and the second current are unreasonable; or
    determining, when one of the first current and the second current is valid and the other is invalid, that the present detection current is the valid current; or
    determining that the present detection current is the greater one of the first current and the second current when the first current and the second current are both invalid and the first current is greater than or equal to an upper limit of the first preset measurement range and the second current is greater than or equal to an upper limit of the second preset measurement range; or
    determining that the present detection current is a detection current for a previous detection cycle when both the first current and the second current are invalid and the first current is less than an upper limit of the first preset measurement range and/or the second current is less than an upper limit of the second preset measurement range.

4. The method according to claim 1, wherein the first current sensor and the second current sensor have different operating principles, and the first current sensor is powered by a first power supply unit and the second current sensor is powered by a second power supply unit, the first power supply unit and the second power supply unit being independent of each other.

5. The method according to claim 4, wherein
    the first current sensor outputs a first signal that is subjected to analog-to-digital conversion processing by a first analog-to-digital converter to obtain the first current; and
    the second current sensor outputs a second signal that is subjected to analog-to-digital conversion processing by a second analog-to-digital converter to obtain the second current;
    wherein the first analog-to-digital converter and the second analog-to-digital converter are independent of each other.

6. The method according to claim 1, wherein determining the current threshold according to the current temperature and the charge/discharge state comprises:
    searching a preset temperature-to-threshold relationship table for a corresponding current threshold according to the current temperature and the charge/discharge state;
    wherein the charge/discharge state comprises a charge state or a discharge state, the temperature-to-threshold relationship table comprises a correspondence between temperatures, the charge state, and current thresholds, and a correspondence between temperatures, the discharge state, and current thresholds.

7. The method according to claim 1, wherein the preset condition comprises the number of times the present detection current exceeds the current threshold reaching a preset number of times, and wherein determining that the overcurrent fault occurs in the battery when the present detection current exceeds the current threshold to satisfy the preset condition comprises:
  when the preset number of times is one, which indicates that the present detection current exceeds the current threshold, determining that an overcurrent fault occurs in the battery; or
  when the preset number of times is multiple, reacquiring a new first current and a new second current when the present detection current exceeds the current threshold, and determining a new present detection current from the new first current and the new second current according to the detection current determination strategy; and
  when the new present detection current exceeds the current threshold, accumulating a corresponding number of times until the number of times the present detection current exceeds the current threshold reaches the preset number of times, then determining that an overcurrent fault occurs in the battery.

8. An apparatus for overcurrent detection, comprising:
  a current acquisition module, configured to acquire a first current at a negative electrode of a battery and a second current at a positive electrode of the battery;
  a present detection current determination module, configured to determine a present detection current from the first current and the second current according to a detection current determination strategy;
  a state acquisition module, configured to acquire a charge/discharge state of the battery;
  a temperature acquisition module, configured to acquire a current temperature of the battery;
  a threshold determination module, configured to determine a current threshold according to the current temperature and the charge/discharge state; and
  a fault determination module, configured to determine that an overcurrent fault occurs in the battery when the present detection current exceeds the current threshold to satisfy a preset condition;
wherein in determining the present detection current from the first current and the second current according to the detection current determination strategy, the present detection current determination module is configured to:
  perform a validity validation of the first current and the second current separately:
  perform a reasonableness validation of the first current and the second current; and
  determine the present detection current according to the result of the validity validation and the result of the reasonableness validation;
wherein in performing the validity validation of the first current and the second current separately, the present detection current determination module is configured to:
  determine that the first current is valid when the first current is within a first preset measurement range and a zero drift value of the first current is less than or equal to a first preset zero drift threshold; or
  determine that the second current is valid when the second current is within a second preset measurement range and a zero drift value of the second current is less than or equal to a second preset zero drift threshold; and
  wherein the first preset measurement range is a measurement range of a first current sensor for measuring the first current and the second preset measurement range is a measurement range of a second current sensor for measuring the second current.

9. A battery management system, comprising:
  a first current sensor, configured to collect a first current at a negative electrode of a battery;
  a second current sensor, configured to collect a second current at a positive electrode of the battery;
  a temperature sensor, configured to collect a current temperature of the battery;
  a processor that is communicatively connected to the first current sensor, the second current sensor, and the temperature sensor; and
  a memory, communicatively connected to the processor and configured to store instructions executable by the processor,
wherein when the instructions are executed by the processor, the battery management system performs a process of overcurrent detection in the battery that comprises:
  acquiring the first current from the first current sensor and the second current from the second current sensor;
  determining a present detection current from the first current and the second current according to a detection current determination strategy;
  acquiring a charge/discharge state of the battery and the current temperature of the battery;
  determining a current threshold according to the current temperature and the charge/discharge state; and
  determining that an overcurrent fault occurs in the battery when the present detection current exceeds the current threshold to satisfy a preset condition;
wherein determining the present detection current from the first current and the second current according to the detection current determination strategy comprises;
  performing validity validation of the first current and the second current separately:
  performing reasonableness validation of the first current and the second current; and
  determining the present detection current according to the result of the validity validation and the result of the reasonableness validation:
wherein performing the validity validation of the first current and the second current separately comprises;
  determining that the first current is valid when the first current is within a first preset measurement range and a zero drift value of the first current is less than or equal to a first preset zero drift threshold; or
  determining that the second current is valid when the second current is within a second preset measurement range and a zero drift value of the second current is less than or equal to a second preset zero drift threshold; and
wherein the first preset measurement range is a measurement range of a first current sensor for measuring the first current and the second preset measurement range is a measurement range of a second current sensor for measuring the second current.

10. A battery, comprising the battery management system according to claim 9.

* * * * *